United States Patent [19]

Shuknecht

[11] Patent Number: 5,431,000
[45] Date of Patent: Jul. 11, 1995

[54] SICKLE-BAR CUTTER ASSEMBLY FOR A FORCED-AIR HARVESTING MACHINE

[75] Inventor: Lee Shuknecht, Elba, N.Y.

[73] Assignee: Lee Shuknecht & Sons, Elba, N.Y.

[21] Appl. No.: 280,034

[22] Filed: Jul. 25, 1994

[51] Int. Cl.$^6$ .................. A01D 34/18; A01D 34/20
[52] U.S. Cl. .................... 56/308; 56/310; 56/327.1; 460/143
[58] Field of Search ............. 56/298, 307, 308, 310, 56/327.1, 121.42; 171/17; 460/143

[56] References Cited

U.S. PATENT DOCUMENTS

| | | | |
|---|---|---|---|
| 888,491 | 5/1908 | Hampton | 56/298 |
| 3,171,242 | 3/1965 | Scarnato et al. | 56/310 |
| 3,518,818 | 7/1970 | Porter | 56/327.1 |
| 4,750,321 | 6/1988 | Klein | 56/310 |
| 4,909,026 | 3/1990 | Molzahn et al. | 56/298 |
| 5,024,278 | 6/1991 | Shuknecht | 171/17 |
| 5,107,664 | 4/1992 | Ross et al. | 56/121.4 |
| 5,197,549 | 3/1993 | Shuff | 171/17 |
| 5,340,042 | 8/1994 | Bergkamp et al. | 56/298 X |

Primary Examiner—George A. Suchfield
Attorney, Agent, or Firm—M. Lukacher

[57] ABSTRACT

Apparatus and method for preventing build-up of sheared material on a sickle-bar cutter assembly for use in removing unwanted tops from root or bulb crops, and an agricultural harvester embodying such an assembly. Stationary components of the assembly, including the knife guard mount bar and optionally an improved knife guard bar, are provided with a plurality of open passageways therethrough to permit process air to flow through the assembly to purge regions above the assembly in which sheared material would otherwise accumulate.

11 Claims, 5 Drawing Sheets

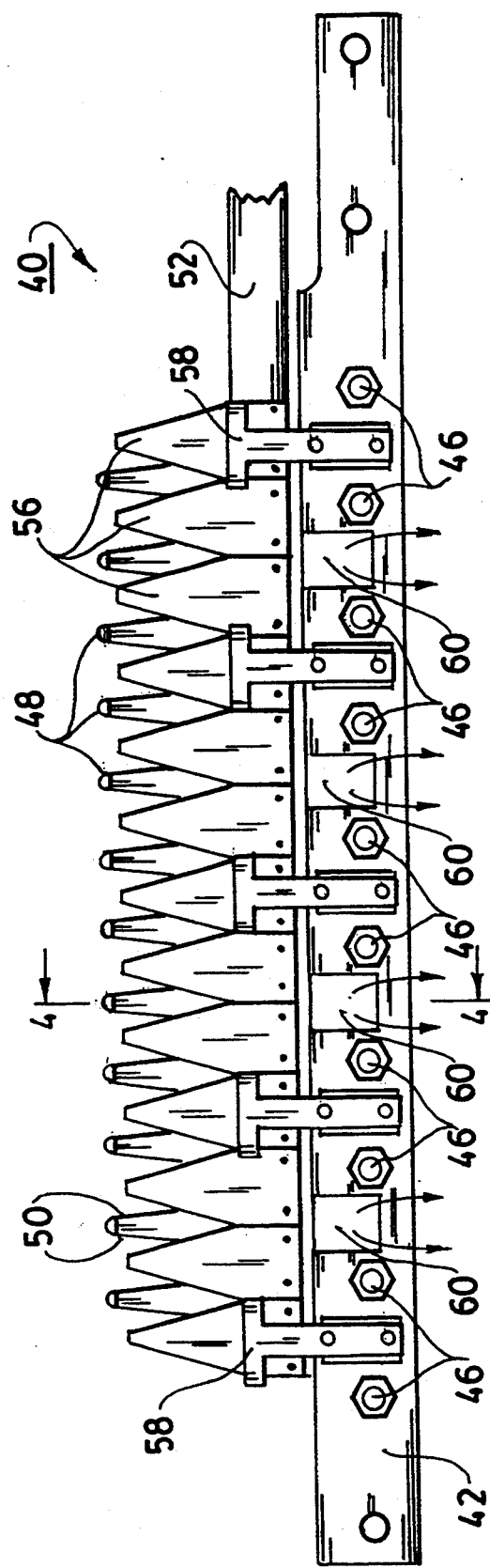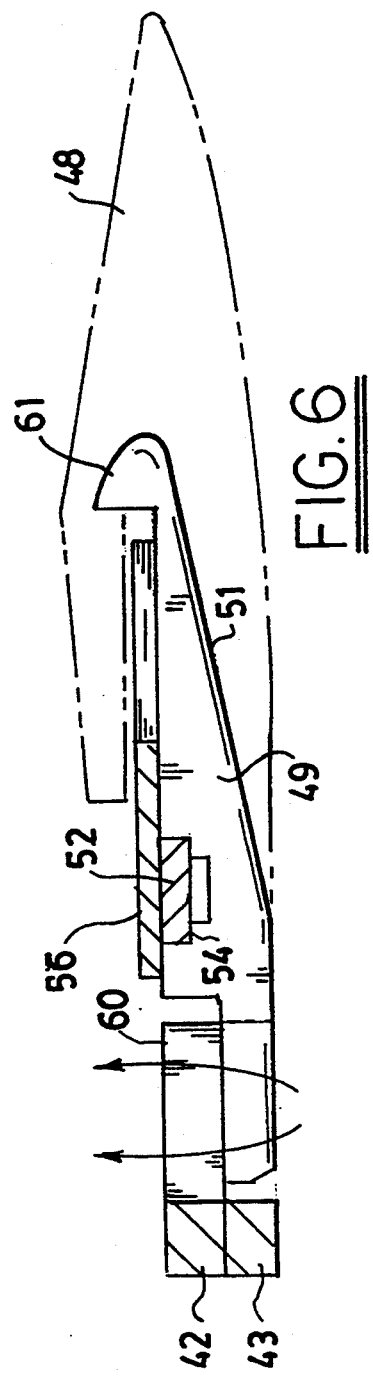

SICKLE-BAR CUTTER ASSEMBLY FOR A FORCED-AIR HARVESTING MACHINE

DESCRIPTION

The invention relates to sickle-bar cutting devices and particularly to machines for harvesting crops which incorporate a sickle-bar cutter to shear the unwanted herbaceous tops from tuberous or root crops.

Harvesting machines are known which collect and process previously-dug tuberous or root crops such as beets, onions, etc. (hereinafter referred to as "crops"). Typically, these harvesters transport the collected plants through the machine to a receptacle by means of a slotted conveyor, and are required to automatically clean the crops and to shear the tops, stems, or other parts of the plants from the bulbs.

In a region within the harvester, the collected plants are exposed to a high-velocity laminar air stream from below the conveyor. The air stream serves to dislodge soils, rocks, and other debris from the plants, which materials either fall out of the machine or are blown out by the forced air stream. The air stream also orients the plants vertically in the region with their tops extended. Further travel of the conveyor engages the tops with a sickle-bar cutter spaced apart from the conveyor, which cutter shears the tops from the bulbs. The severed tops are then entrained in the air stream and carried out of the harvester, while the cleaned and processed bulbs are conveyed to a receptacle.

Examples of harvesters using forced air flow to position crop tops for shearing by sickle-bar cutters are disclosed in U.S. Pat. No. 5,024,278 to Shuknecht, issued Jun. 19, 1991; U.S. Pat. No. 5,107,664 to Ross et. al, issued Apr. 28, 1992; and U.S. Pat. No. 5,197,549 to Shuff, issued Mar. 30, 1993. These harvesters rely on a high-velocity air stream to carry the sheared tops away from the sickle-bar cutter. However, the cutter, necessarily being a relatively large, rugged device, presents an inherently substantial blockage of the air stream, spoiling the laminarity of the air flow and creating one or more eddy regions of turbulence or low air velocity on the downstream side of the cutter. Portions of the sheared tops which fall into these regions can accumulate progressively on the upper surface of the sickle-bar assembly, eventually fouling the cutter and forcing a shutdown of the harvester to clean the cutting mechanism.

Furthermore, known sickle-bar assemblies have relatively long, thick knife guard members which can inadvertently damage large bulbs during or after the shearing operation.

It is a principal object of the invention to provide an improved sickle-bar cutter assembly which does not accumulate debris on the back, or downstream, side of the assembly.

It is a further object of the invention to provide an improved sickle-bar cutter assembly which does not damage bulb crops while shearing their tops.

It is a still further object of the invention to provide a forced-air harvesting machine embodying a sickle-bar cutter assembly which does not accumulate debris on the back, or downstream, side of the assembly.

It is a still further object of the invention to provide a simple, inexpensive knife guard assembly for a sickle-bar cutter assembly.

It is a still further object of the invention to provide a method whereby an improved sickle-bar cutter assembly can be operated without fouling of the cutter by accumulation of sheared material on the cutting assembly.

Briefly described, as embodied in a harvester wherein a bulb crop is carried by a conveyor which supports the crop and has openings or slots through which air can be blown, and wherein a sickle-bar cutter assembly shears the oriented tops of the crop, the invention comprises a sickle-bar cutter assembly which has one or more open passageways between the front and back sides of the assembly, through which a portion of the orienting air stream passes to prevent accumulation of sheared material on the back side of the assembly. The knife guards of this assembly are preferably relatively short and slim to avoid damaging the bulbs. A preferred knife guard bar assembly is formed from easily fabricated components and is assembled inexpensively as by welding.

In a typical orientation of a sickle-bar cutter assembly in a harvesting machine, the front and back sides of the assembly are the under and upper sides, respectively. Preferably, the size, number, and locations of the air passageways are chosen to provide high velocity air flow in those regions adjacent to the upper side or surface of the assembly which would otherwise have low velocity air flow and therefore be susceptible to accumulation of sheared material.

The foregoing and other objects, features, and advantages of the invention as well as a presently preferred embodiment thereof and the best mode now known for practicing the invention will become more apparent from a reading of the following description in connection with the accompanying drawings in which.

Figure 3:
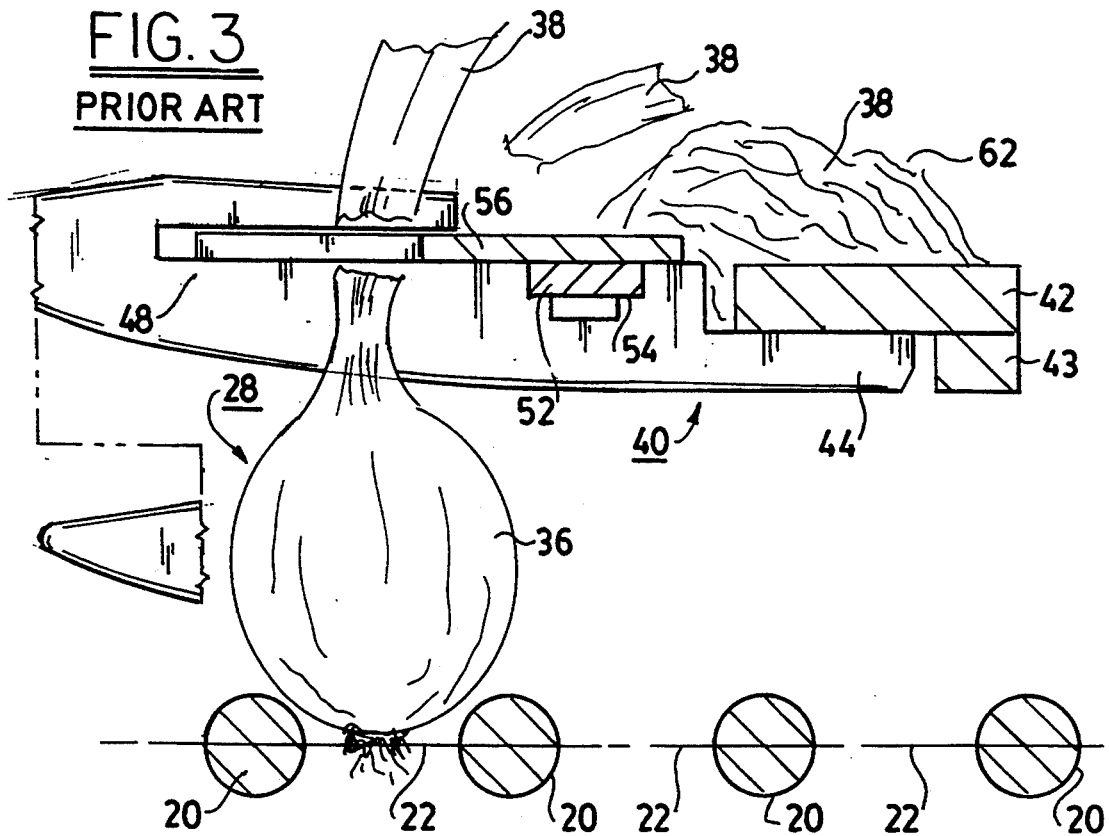
FIG. 3 is a vertical cross-sectional view of a prior art sickle-bar cutter assembly, in operation, showing a relatively long, thick knife guard which can easily damage the bulb during shearing of the top, and showing the accumulation of sheared material on top of the assembly.
Figure 4:
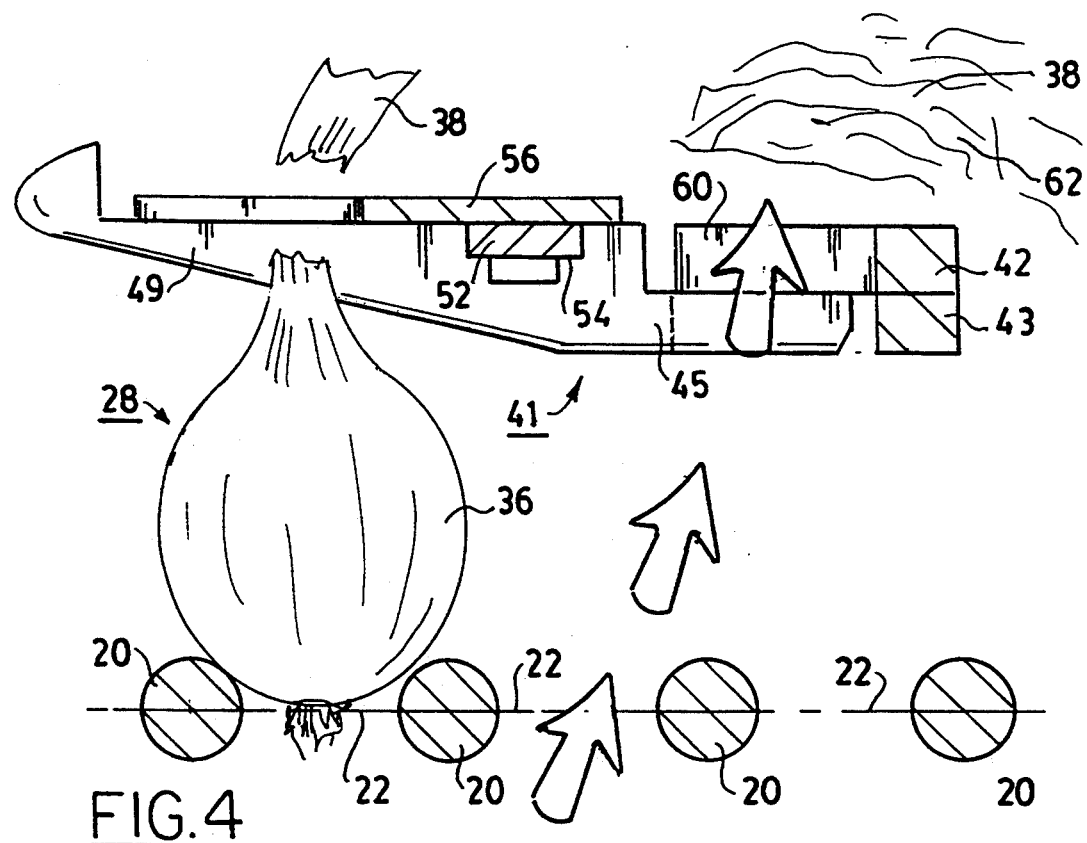
Figure 7:
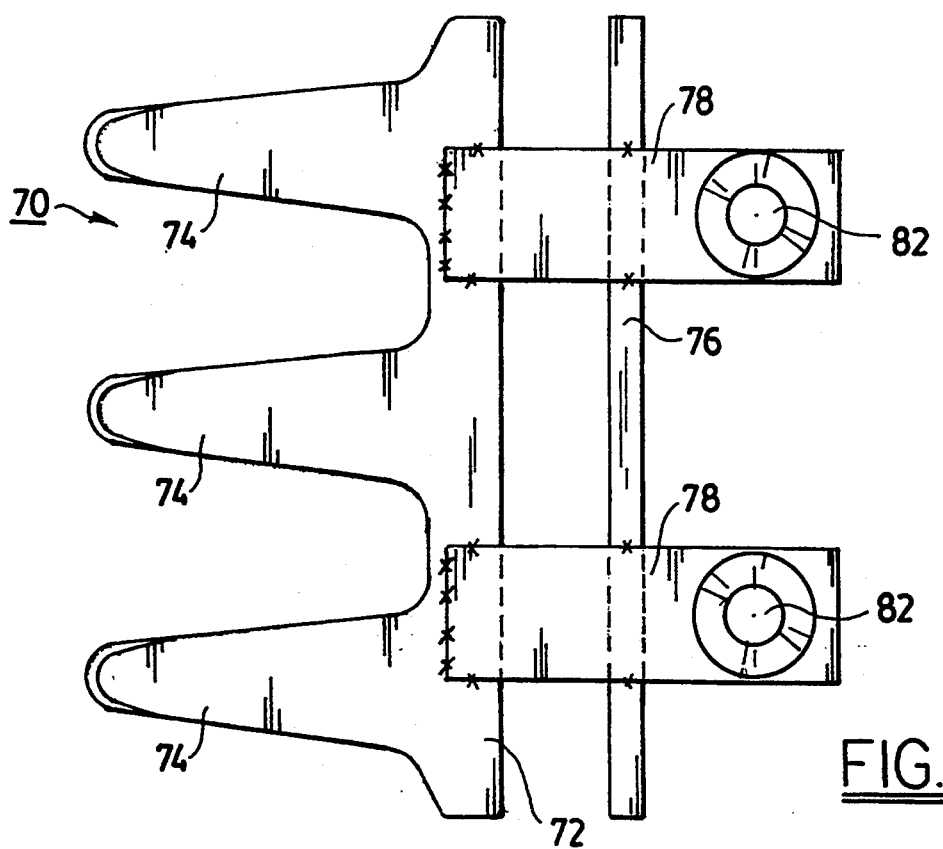
Figure 8:
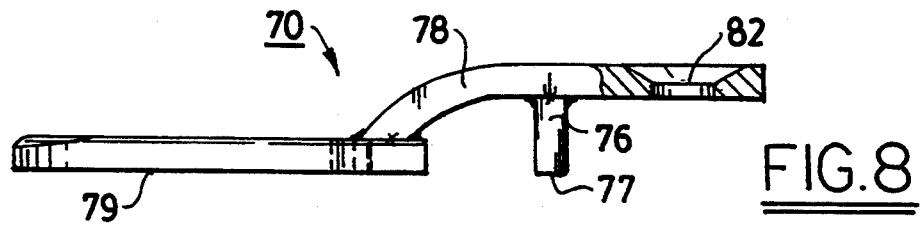

FIG. 4 is a vertical cross-sectional view of a sickle-bar assembly in accordance with the invention, in operation, taken along line 4—4 in FIG. 5, showing a shorter and slimmer knife guard than the prior art in FIG. 3, and also showing sheared material which would otherwise accumulate on top of the assembly being carried away by air flowing through a passageway between the front side and back side of the assembly;

FIG. 5 is a plan view of a sickle-bar cutter assembly according to the invention, showing locations of the passageways in the knife guard mount bar and the sickle bar;

FIG. 6 is a composite view of the sickle-bar assemblies shown in FIGS. 3 and 4, showing the reduction in length and shape of the knife guard in accordance with the invention;

FIG. 7 is a plan view of a preferred embodiment of a knife guard bar in accordance with the invention;

FIG. 8 is a vertical cross-sectional view of the knife guard bar in FIG. 7; and

Figure 9:
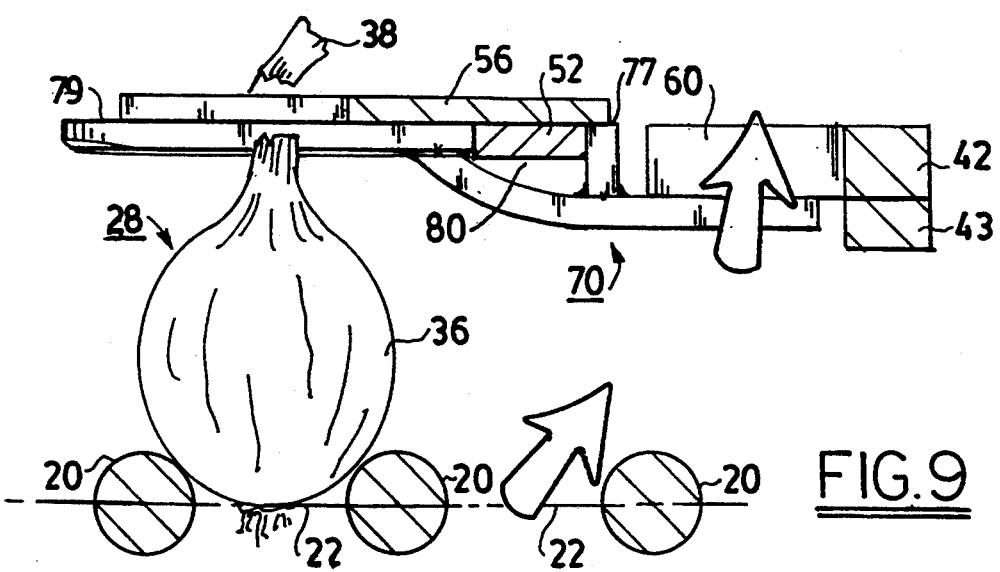

FIG. 9 is a vertical cross-sectional view of a preferred sickle-bar assembly in accordance with the invention incorporating the knife guard bar of FIGS. 7 and 8 in operation to shear onion tops from bulbs.

Figure 1:
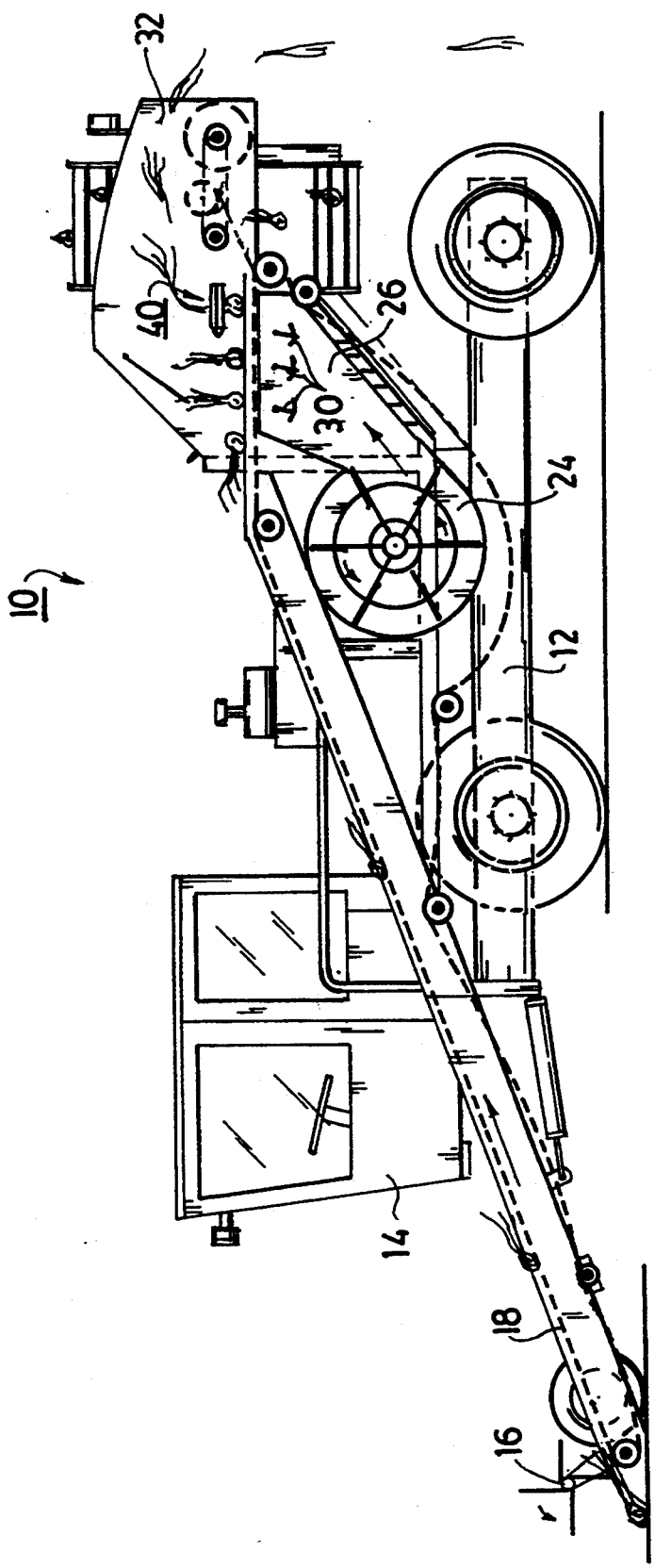
FIG. 1 is a vertical, partial cross-sectional view of a harvester embodying a sickle-bar cutter assembly according to the invention.
Figure 2:
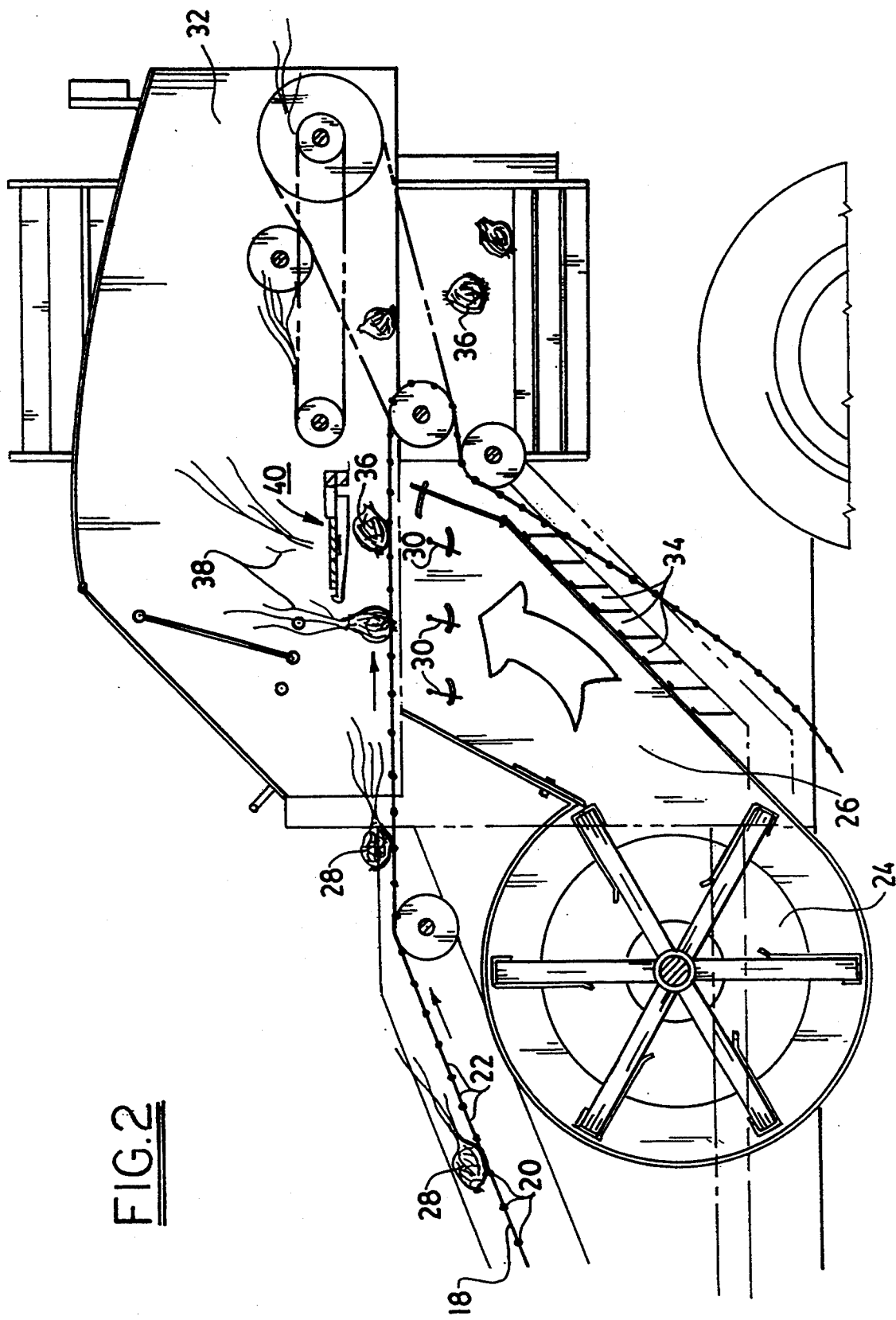
FIG. 2 is a close-up view of the cross-sectional portion of FIG. 1.

Referring to FIGS. 1 and 2, there is shown a self-propelled onion harvesting machine 10 similar to that disclosed by the inventor in his prior U.S. Pat. No. 5,024,278. A chassis 12 supports a cab 14 and conventional components (not shown) for motivation, braking, steering, and operation of the harvesting components. The harvesting components function together to collect previously-dug onions which are lying on the surface of the ground; to convey the onions to a process region within the machine; to free the bulbs of clinging dirt and debris; to shear the vegetative tops; to exhaust the sheared tops, dirt, and debris from the harvester; and to convey the processed bulbs to an associated receptacle. A paddle wheel 16 collects the onion plants and places them on a bar-chain conveyor 18 which conveys them to a process region within the machine in which the path of conveyor 18 is substantially horizontal. The conveyor is constructed such that transverse slots or openings 22 narrower than the diameter of the onion bulbs exist between the bars 20 comprising the chain, as shown in FIGS. 1 through 4, whereby bulbs of saleable size are retained on the conveyor but small onions, stones, dirt, and other debris are permitted to fall through.

In the process region, a high velocity stream of air is provided by blower 24 through venturi duct 26, which air stream is impinged upon the underside of conveyor 18 and passes through openings 22. This air stream is collimated by baffles 30 to be substantially laminar when impinged upon conveyor 18. The air stream cleans the onion plants 28 of remaining dirt and debris, which are either blown out an air discharge chute 32 or fall to the ground by gravity through openings 34 in the underside of duct 26. The air stream also orients the plants vertically with their vegetative tops 38 streaming upwards. Further travel of conveyor 18 serves to bring the oriented onion plants into engagement with a horizontal, transverse sickle-bar cutter assembly 40 rigidly mounted in the machine at a spacing from conveyor 18 such that a desired length of top will be left with bulb 36.

A conventional sickle-bar cutter assembly 40 is shown in FIG. 3. A stationary mount bar 42 provides a frame for the assembly and has a stiffening bar 43 attached to it as by welding and a stationary knife guard bar 44 fastened to mount bar 42 by bolts 46, as shown in FIG. 5. Guard bar 44 is flat on a section of its upper surface and is formed along one edge to provide a plurality of knife guards 48, each one sharpened on its edges 50. Knife mount bar 52 is disposed for sliding by reciprocal motion in a channel 54 relieved in guard bar 44, and is operationally connected to a reciprocating actuator (not shown). A plurality of double-edged knives 56 are mounted on bar 52, as shown in FIG. 5, in scissor-cutting relationship with knife guards 48 and edges 50. Knife hold-downs 58 are mounted on the upper surface of mount bar 42 and ride adjustably on the flat upper surfaces of knives 56 to promote firm cutting between knife guard edges 50 and knives 56. The assembly of knives 56 on bar 52 is known commonly as a "sickle-bar cutter." The larger assembly 40 of a sickle-bar cutter, knife hold-downs, knife guards, mount bar, and frame is herein referred to as a "sickle-bar cutter assembly."

FIG. 4 shows an improved sickle-bar cutter assembly 41 in accordance with the invention. Prior art knife guard 48 shown in FIG. 3 is relatively large and thick, and is prone to damaging crop bulbs by spearing or crushing them as the tops are being sheared. Improved knife guard 49 and guard bar 45 are substantially shorter and slimmer than their prior art counterparts, and knife guard 49 has an inclined or beveled lower edge 51 which helps bulb 36 to rotate after having its top sheared, thereby avoiding damage.

Another improvement in the apparatus shown in FIG. 4 over that of FIG. 3 is the presence of open passageways 60 through mount bar 42 between the bores for bolts 46. In conjunction with mating passageways in knife guard bar 45, passageways 60 permit air from blower 24 under pressure below assembly 41 to pass through assembly 41 at high velocity and to thereby ventilate regions 62 which are otherwise stagnant, as in prior art assemblies, and are prone to accumulate sheared material 38 as shown in FIG. 3. Although intermittent sections of the upper surface of bar 42 remain unventilated, for example in the vicinity of hold-downs 58, air passing through passageways 60 keeps a sufficient area of bar 42 clear of sheared material that the cutting mechanism of assembly 41 is able to function substantially indefinitely without becoming fouled.

Alternatively, knife guard bar 44 can be replaced by a plurality of individual improved knife guards 49, each bolted to mount bar 42 and each shaped both to avoid damage to bulbs being sheared and to cooperate with adjacent guards to permit the passage of air through mount bar 42.

A comparison between the prior art knife guard 48 and improved knife guard 49 is shown in FIG. 6. The prior art guard is shown in phantom outline. The improved guard has a short, blunt nose 61, making it less prone to spear or puncture large bulbs, and an inclined or beveled lower edge 51 which causes large bulbs to roll and thereby avoid damage after shearing of their tops.

A preferred embodiment of a knife guard assembly in accordance with the invention is shown in FIGS. 7–9. Assembly 70 comprises a planar member 72 having first and second surfaces which are substantially planar and parallel and which is formed as by stamping from sheet metal such as steel to provide a plurality of knife guard members 74. A stiffening spacer member 76 is connected parallel to, and spaced apart from, planar member 72 by curved straps 78, as by welding. Straps 78 and spacer member 76 can be formed by cutting and bending from strap or sheet metal stock. The free edge 77 of spacer 76 is coplanar with the cutting edges 79 of knife guards 74 and is spaced from member 72 to form a channel 80 for the reciprocating movement of knife bar 52 and knives 56. Straps 78 are provided with countersunk holes 82 to accept the flat heads of bolts 46 by which assembly 70 is attached to mount bar 42, thereby providing a smooth undersurface in straps 78 to avoid scarring of passing bulbs. Knife guard assembly 70 is easily fabricated from sheet metal stock and does not require the expensive plurality of individual cast knife guards typical of some prior art sickle-bar cutter assemblies. Assembly 70 is thus far simpler and less expensive to fabricate, while providing important performance improvements.

The operational difference between the prior art and the improved sickle-bar cutter assembly is shown in FIGS. 3 and 4. When oriented onions 28 are engaged with sickle-bar cutter assembly 40, tops 38 are sheared from bulbs 36. The tops are entrained in the air stream flowing around assembly 40, and most of the top material is carried away from the assembly. However, in prior art sickle-bar cutter assembly 40, a low air velocity region or "air shadow" is present over the assembly above mount bar 42, causing some material of sheared tops 38 to accumulate on the upper surface of the assembly. With continued operation of the harvester, this accumulation increase to a point at which sheared material can no longer clear the assembly and the cutting mechanism becomes inoperative, requiring the machine to be shut down for cleaning or repair. Improved sickle-bar cutter assembly 41 shown in FIG. 4 is provided with open passageways 60 which permit the flow of high velocity air through the assembly, which air flow prevents practically significant accumulation of sheared material on the assembly.

From the foregoing description, it will be apparent that there has been provided an improved harvesting machine and particularly an improved topping mechanism therefor. Variations and modifications in the herein described machine, within the scope of the invention, will undoubtedly suggest themselves to those skilled in the art. Accordingly, the foregoing description should be taken as illustrative and not in a limiting sense.

What is claimed is:

1. In a sickle-bar cutter assembly wherein the surfaces of said assembly are to be kept free of sheared material by the flushing action of an air stream flowing past said assembly, the improvement comprising a plurality of open passageways through said assembly to permit more thorough flushing of said surfaces in the air shadow of said assembly.

2. The sickle-bar cutter assembly according to claim 1 further comprising a sickle bar cutter and a knife guard assembly in which said cutter is reciprocally movable and wherein components of said assembly are formed from sheet metal stock.

3. The sickle-bar cutter assembly according to claim 1 further comprising a sickle bar cutter having a knife bar, and a knife guard assembly comprising:
   a) a first member having substantially parallel and planar first and second surfaces formed to provide a plurality of knife guard members;
   b) a second member spaced apart from said first member to form a transverse channel, said knife bar being mounted for reciprocal movement in same channel; and
   c) a plurality of straps connecting said first member to said second member in said spaced apart relationship and defining open passageways between said straps, said passageways permitting flow of a portion of said air stream through said knife guard assembly.

4. In a harvester wherein a crop is carried by a conveyor which supports said crop, said conveyor having openings through which an air stream can be blown from a blower in a region through which said conveyor passes, in which region the tops of said crop are sheared by a sickle-bar cutter assembly and then blown away from said assembly, and wherein said sickle-bar cutter assembly is in blocking relationship with said air stream whereby portions of said sheared tops are prevented from being blown away from a plurality of areas adjacent to said assembly, the improvement comprising a sickle-bar cutter assembly having a plurality of passageways through said assembly proximal to said areas to permit a portion of said air stream to pass through said sickle-bar cutter assembly sufficient to blow away said portions of said sheared tops from said areas.

5. The improvement according to claim 4 wherein said sickle-bar cutter assembly comprises a plurality of knife guards which are beveled on their undersides in said region to prevent damage to said crop.

6. The improvement according to claim 4 wherein said sickle-bar cutter assembly comprises a knife guard assembly further comprising:
   a) a first member having substantially parallel and planar first and second surfaces formed to provide a plurality of knife guard members;
   b) a second member spaced apart from said first member to form a transverse channel, said channel being adapted to accept a reciprocating knife bar; and
   c) a plurality of straps connecting said first member to said second member in said spaced apart relationship and defining open passageways between said straps, said passageways permitting flow of said air through said knife guard assembly.

7. A method for preventing the accumulation of sheared material on an upper surface of a sickle-bar cutter assembly, comprising the steps of:
   a) providing a plurality of passageways through one or more components of said sickle-bar cutter assembly; and
   b) passing sufficient air through said passageways to blow away said sheared material from said assembly.

8. A knife guard assembly for a sickle-bar cutter, said knife guard assembly comprising:
   a) a first member having substantially parallel and planar first and second surfaces defining top and underside surfaces of said knife guard assembly;
   b) a second member spaced apart from said first member to form a transverse channel in which said sickle bar cutter is mounted for reciprocating movement on said top surface; and
   c) a plurality of straps connecting said first member to said second member in said spaced apart relationship and defining open passageways between said straps.

9. The knife guard assembly according to claim 8 wherein said knife guard members are beveled on their underside surfaces.

10. The knife guard assembly according to claim 8 wherein said first member is a stamping.

11. The knife guard assembly according to claim 10 wherein the stamping is formed from sheet metal.

* * * * *